(12) United States Patent
Lei et al.

(10) Patent No.: US 10,209,871 B2
(45) Date of Patent: Feb. 19, 2019

(54) TWO-DIMENSIONAL INDICATION IN CONTENTS

(71) Applicant: INTERNATIONAL BUSINESS MACHINES CORPORATION, Armonk, NY (US)

(72) Inventors: Chang Lei, Shanghai (CN); Xiao Xia Mao, Shanghai (CN); Wenwen Yang, Shanghai (CN); Jie Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 14/918,889

(22) Filed: Oct. 21, 2015

(65) Prior Publication Data

US 2017/0115858 A1 Apr. 27, 2017

(51) Int. Cl.
*G06F 3/048* (2013.01)
*G06F 3/0484* (2013.01)
*G09G 5/38* (2006.01)
*G06F 3/0488* (2013.01)
*G06F 3/0354* (2013.01)
(Continued)

(52) U.S. Cl.
CPC ...... *G06F 3/04845* (2013.01); *G06F 3/03543* (2013.01); *G06F 3/04883* (2013.01); *G09G 5/14* (2013.01); *G09G 5/346* (2013.01); *G09G 5/38* (2013.01); *G06F 2203/04803* (2013.01); *G06F 2203/04806* (2013.01);
(Continued)

(58) Field of Classification Search
CPC ............. G06F 3/04845; G06F 3/03543; G06F 3/04883; G09G 5/14; G09G 5/346; G09G 5/38

USPC ......................................................... 715/799
See application file for complete search history.

(56) References Cited

U.S. PATENT DOCUMENTS 5,263,134 A * 11/1993 Paal ...................... G06F 3/0485
345/684
7,471,284 B2 12/2008 Bathiche et al.
(Continued)

OTHER PUBLICATIONS

Kolar, Tate; Two Dimensional Scroll Box; IP.com prior art database; Jul. 1, 1994.

(Continued)

*Primary Examiner* — Abdullah Al Kawsar
*Assistant Examiner* — Jianmei F Duckworth
(74) *Attorney, Agent, or Firm* — Isaac Gooshaw; George S. Blasiak; Heslin Rothenberg Farley & Mesiti PC (57) ABSTRACT

This disclosure provides a method for two-dimensional indication in viewing contents. The method comprises in one embodiment displaying a content page in a content display window, wherein at least one of length and width of the content page exceeds the size of the content display window. The method further comprises in one embodiment displaying indicators located at four corners of the content display window, wherein each of the indicators indicates the size of part of the content page that is outside the corresponding corner of the content display window. The method further comprises in one embodiment in response to detecting a user operation that moves the content page relative to the content display window, changing each of the indicators to reflect the current size of part of the content page that is outside the corresponding corner of the content display window.

9 Claims, 5 Drawing Sheets

(51) Int. Cl.
*G09G 5/14* (2006.01)
*G09G 5/34* (2006.01)

(52) U.S. Cl.
CPC . *G09G 2340/04* (2013.01); *G09G 2340/0464* (2013.01); *G09G 2340/145* (2013.01); *G09G 2354/00* (2013.01)

(56) References Cited

U.S. PATENT DOCUMENTS

| | | | |
|---|---|---|---|
| 7,536,410 B2 | 5/2009 | Wong et al. | |
| 7,987,433 B2 | 7/2011 | Cox et al. | |
| 8,205,168 B1 | 6/2012 | Van Slembrouck | |
| 8,402,386 B2 | 3/2013 | Hakiel et al. | |
| 2003/0025678 A1* | 2/2003 | Lee | G06F 3/038 345/173 |
| 2004/0066393 A1* | 4/2004 | Cragun | G06T 3/40 345/660 |
| 2011/0310119 A1* | 12/2011 | Takagi | G06F 3/04845 345/620 |
| 2012/0066638 A1 | 3/2012 | Ohri | |
| 2014/0149922 A1 | 5/2014 | Hauser et al. | |

OTHER PUBLICATIONS

Static and Divided Scroll Bar With a Preview of Content; IP.com prior art database; Aug. 12, 2013.

* cited by examiner

TWO-DIMENSIONAL INDICATION IN CONTENTS

BACKGROUND

The present invention relates to a field of computer user interface, and more specifically, to a method and a system for two-dimensional indication in contents.

Recently, as the mobile devices become more and more popular, people normally spend much time on reading contents on the screen of the mobile devices. When viewing information on a touch screen of a mobile device, the current indication method is only one-dimensional. For example, when you browse a web page, you slide and view the page in a vertical way, and there is an indicator in the scroll bar on the right side of the screen showing the real-time viewing position on the whole page. The position of the slider (i.e., the indicator) on the scroll bar shows the position of the currently displayed content on the whole page. However, there are occasions where both the length and the width of the page to be displayed exceed the screen size, such as viewing a zoomed-in picture, a large table, a map, and etc.

SUMMARY

According to an embodiment of the present invention, there is provided a method for two-dimensional indication in browsing contents. The method comprises displaying a content page in a content display window, wherein at least one of length and width of the content page exceeds the size of the content display window. The method further comprises displaying indicators located at four corners of the content display window, wherein each of the indicators indicates the size of part of the content page that is outside the corresponding corner of the content display window. The method further comprises in response to detecting a user operation that moves the content page relative to the content display window, changing each of the indicators to reflect the current size of part of the content page that is outside the corresponding corner of the content display window.

According to another embodiment of the present invention, there is provided a system for two-dimensional indication in browsing contents. The system comprises one or more processor. The system further comprises a set of computer program instructions stored in the memory and executed by the one or more processor in order to perform an action of displaying a content page in a content display window, wherein at least one of length and width of the content page exceeds the size of the content display window. The system further comprises a set of computer program instructions stored in the memory and executed by the one of the processor in order to perform an action of displaying indicators located at four corners of the content display window, wherein each of the indicators indicates the size of part of the content page that is outside the corresponding corner of the content display window. The system further comprises a set of computer program instructions stored in the memory and executed by the one or more processor in order to perform an action of in response to detecting a user operation that moves the content page relative to the content display window, changing each of the indicators to reflect the current size of part of the content page that is outside the corresponding corner of the content display window.

According to a further embodiment of the present invention, there is provided a computer program product for two-dimensional indication in browsing contents. The computer program product comprises a computer readable storage medium having program instructions embodied therewith. The program instructions being executable by a device to perform a method. The method comprises displaying a content page in a content display window, wherein at least one of length and width of the content page exceeds the size of the content display window. The method further comprises displaying indicators located at four corners of the content display window, wherein each of the indicators indicates the size of part of the content page that is outside the corresponding corner of the content display window. The method further comprises in response to detecting a user operation that moves the content page relative to the content display window, changing each of the indicators to reflect the current size of part of the content page that is outside the corresponding corner of the content display window.

BRIEF DESCRIPTION OF THE DRAWINGS

FIG. 5 and FIG. 6 show a one-dimensional sliding operation on the screen according to one embodiment of the present invention, wherein FIG. 5 shows the state before the sliding operation and FIG. 6 shows the statue after the sliding operation; and FIG. 7 and FIG. 8 show a two-dimensional sliding operation on the screen according to one embodiment of the present invention, wherein FIG. 7 shows the state before the sliding operation and FIG. 8 shows the statue after the sliding operation.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
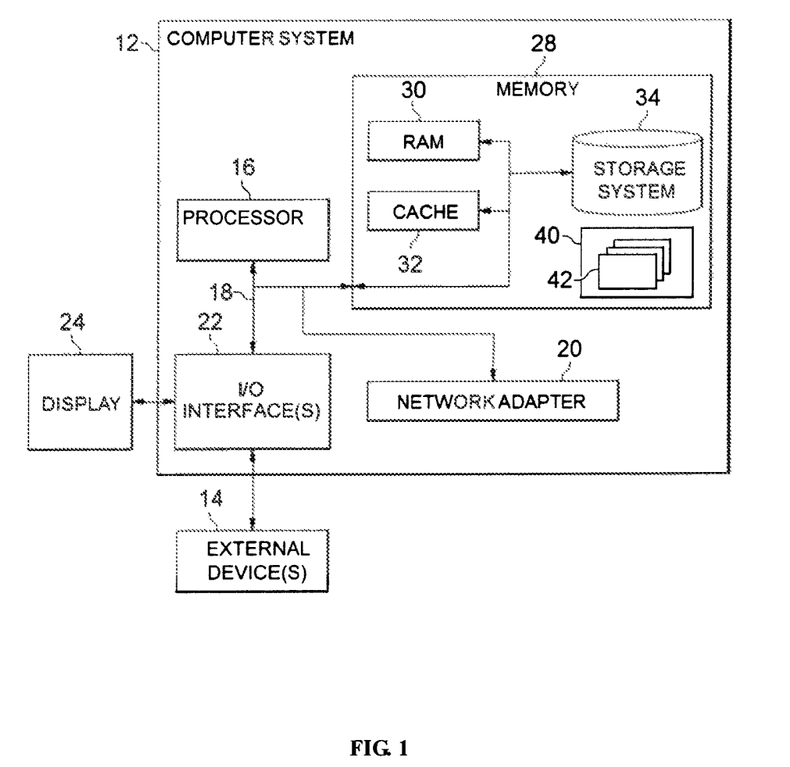
FIG. 1 shows an exemplary computer system which is applicable to implement the embodiments of the present invention.

Referring now to FIG. 1, in which an exemplary computer system 12 which is applicable to implement the embodiments of the present invention is shown. Computer system 12 is only illustrative and is not intended to suggest any limitation as to the scope of use or functionality of embodiments of the invention described herein.

As shown in FIG. 1, computer system 12 is shown in the form of a general-purpose computing device. The components of computer system 12 may include, but are not limited to, one or more processor 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

One or more program 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

This disclosure provides a solution of displaying both horizontal and vertical status of large pages. This solution is especially suitable for a mobile device with a touch screen. However, this solution can be also applied to a PC such as a desktop or a laptop.

Figure 2:
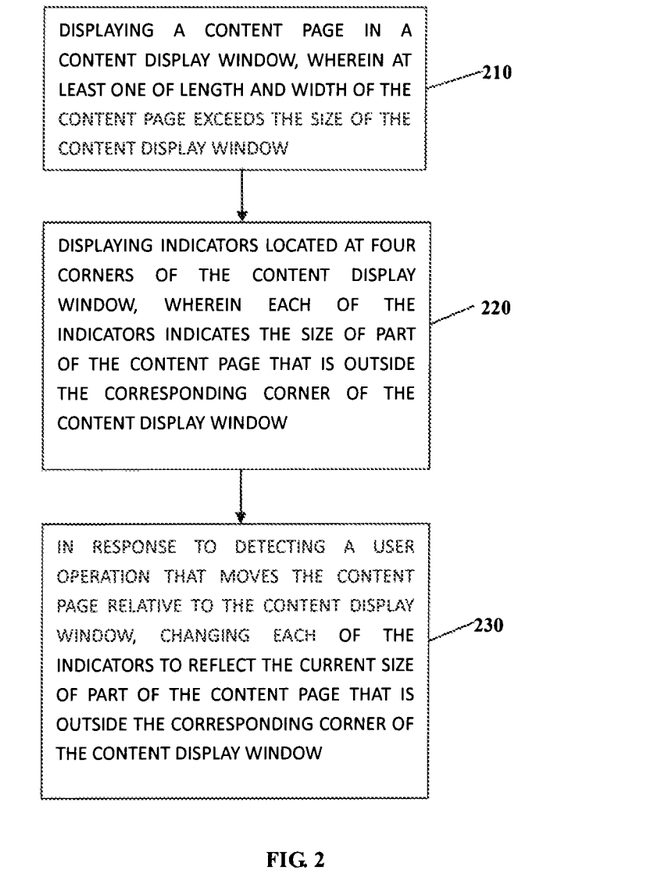
FIG. 2 is a flowchart illustrating a method for two-dimensional indication in browsing contents according to an embodiment of the present invention.

With reference now to FIG. 2, FIG. 2 is a flowchart illustrating a method for two-dimensional indication in browsing contents according to an embodiment of the present invention. As shown in FIG. 2, the method for two-dimensional indication in browsing contents includes a content page displaying block 210, a indicator displaying block 220 and a indicator changing block 230. Hereinafter, respective functions of the method for two-dimensional indication in browsing contents in the FIG. 2 are explained in detail.

In the content page displaying block 210, one or more program 40 can display a content page in a content display window. At least one of length and width of the content page exceeds the size of the content display window. In one embodiment of the present invention, in a mobile device, the content display window has the same size as the touch screen of the mobile device. That is, the whole touch screen is used as a content display window. In another embodiment of the present invention, in a PC, the content display window is the window of an application such as web browser, picture browser, table editor, and navigation application and etc. For example, the content page may be a page that contains at least one of web page, picture, table, and map.

In the indicator displaying block 220, one or more program 40 can display indicators located at four corners of the content display window. Each of the indicators can indicate the size of part of the content page that is outside the corresponding corner of the content display window. In one embodiment of the present invention, the indicator can have a shape such as circle, square, or rectangle. Extra contents belonging to the content page but not being displayed on the current screen are represented by four indicators at four corners of the screen, when the content page is larger than the content display window.

Figure 3:
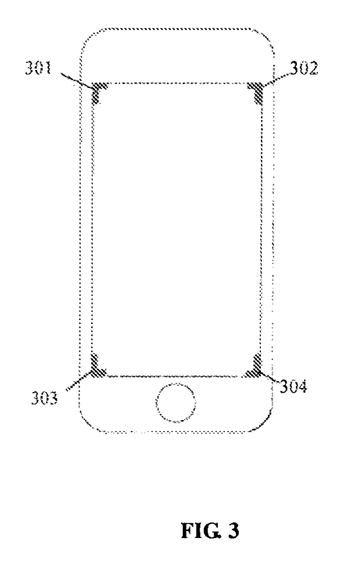
FIG. 3 shows indicators according to one embedment of the present invention.

FIG. 3 shows indicators according to one embedment of the present invention. In FIG. 3, four indicators (301, 302, 303, and 304) are displayed at four corners of the screen of a mobile device. In this embodiment, the shapes of the four indicators are not the same and reflect the shapes of parts of the content page that exceed the content display window.

Figure 4:
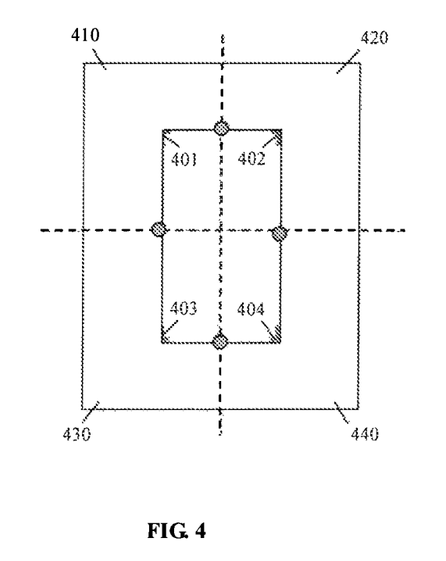
FIG. 4 shows the correspondence of the shapes of the indicators and the parts of the content page that exceed the content display window.

FIG. 4 shows the correspondence of the shapes of the indicators and the parts of the content page that exceed the content display window. In FIG. 4, the small rectangle represents the screen of the mobile device in FIG. 3, and the big rectangle represents the whole content page. In the embodiment of FIG. 4, the content page is divided by a horizontal central line and a vertical central line of the content display window into four sections. It is assumed that, in FIG. 4, the content page is a large picture. In this embodiment, only the central part of the picture is displayed on the screen. Since the picture is larger than the screen, some parts of the picture cannot be displayed. In FIG. 4, the part 430 of the left bottom section is not displayed on the screen, which is shown to explain the solution of the present invention, but actually the part 430 is invisible to the user of the mobile device, so do parts 410, 420 and 440 of the content page in FIG. 4.

In one embodiment of the present invention, each of the indicators indicates the size of part of the corresponding section that is outside the corresponding corner of the content display window. Specifically, the size of part of corresponding section that is outside the corresponding corner of the content display window can be reflected by at least one of color, size, and shape of the corresponding indicator. In one embodiment of the present invention, the larger the size of part of corresponding section that is outside the corresponding corner is, the deeper the color of the corresponding indicator is. In another embodiment of the invention, the indicator can even be a number that is large if the size of part of corresponding section that is outside the corresponding corner is large, and vice versa.

Take FIG. 4 as an example, the size of the indicator 401 indicates the size of part 410 of the content page that is outside the left top corner of the content display window; the indicator 402 indicates the size of part 420 of the content page that is outside the right top corner of the content display window; the indicator 403 indicates the size of part 430 of the content page that is outside the left bottom corner of the content display window; and the indicator 404 indicates the size of part 440 of the content page that is outside the right bottom corner of the content display window. In a preferred embodiment of the present invention, the size of each of the indicators is proportional to the size of part of the corresponding section that is outside the content display window.

In one embodiment, of the present invention, the shape of each of the indicators is the same as the shape of part of the corresponding section that is outside the content display window. Take FIG. 4 as an example, the shape of indicator 401 is the same as the shape of part 410 of the content page that is outside the left top corner of the content display window; the shape of indicator 402 is the same as the shape of part 420 of the content page that is outside the right top corner of the content display window; the shape of indicator 403 is the same as the shape of part 430 of the content page that is outside the left bottom corner of the content display window; and the shape of indicator 404 is the same as the shape of part 440 of the content page that is outside the right bottom corner of the content display window. For example, the indicator 403 has a shape of "L", which shows that, there are contents on the left side and on the bottom side of the screen that are left not being displayed and can be dragged into the screen for display.

In the indicator changing block 230, in response to detecting a user operation that moves the content page relative to the content display window, one or more program 40 can change each of the indicators to reflect the current size of part of the content page that is outside the corresponding corner of the content display window. In the embodiment where the shape of the is a simple shape such as circle, square, or rectangle, in response to detecting a user operation that moves the content page relative to the content display window, each of the indicators will change to reflect the current size of part of the content page that is outside the corresponding corner of the content display window. That is, in one embodiment, the shape of the indicator will not change, and the size of the indicator will reflect the area of the part of the content page that is outside the corresponding corner of the content display window.

In another embodiment, of the present invention in one aspect where the shape of each of the indicators is the same as the shape of part of the corresponding section that is outside the content display window, in response to detecting a user operation that moves the content page relative to the content display window, the shape of each of the indicators changes to reflect the current shape of part of the corresponding section that is outside the content display window.

Figure 5:
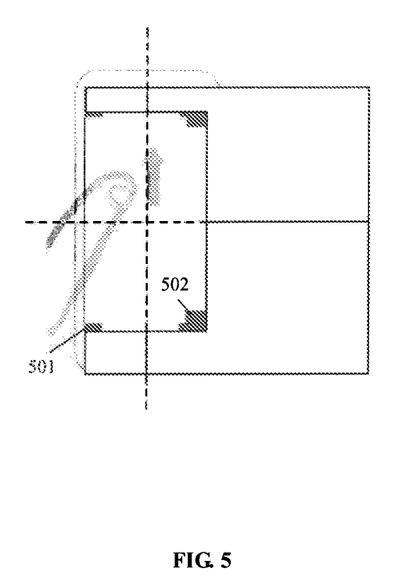
Figure 6:
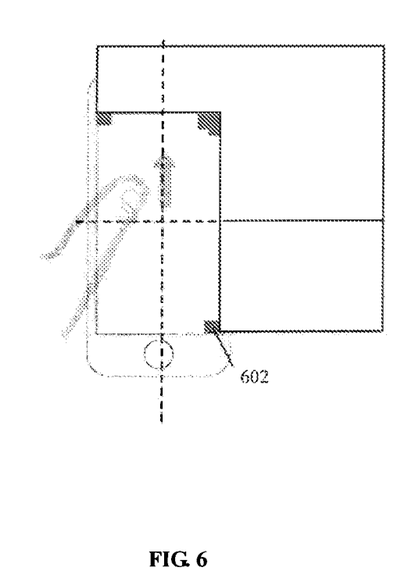

FIG. 5 and FIG. 6 show a one-dimensional sliding operation on the screen according to one embodiment of the present invention. FIG. 5 shows the state before the sliding operation and FIG. 6 shows the statue after the sliding operation. In the FIG. 5, the shape of each of the indicators is the same as the shape of part of the corresponding section that is outside the content display window, and the size of each of the indicators is proportional to the size of part of the corresponding section that is outside the content display window. For example, before the sliding operation, the screen displays the left most part of the content page and there are not contents on the left side of the screen, so the indicator 501 at the left bottom corner has a shape of "-", showing there are contents not displayed only on the bottom side of the screen. On the other hand, the indicator 502 at the right bottom corner has a shape of side-inverted "L", showing there are contents not displayed on both of the right side and the bottom side of the screen. Under the state of FIG. 5, the user touches the screen with a finger and slides the content page upwards in the vertical direction. With the sliding operation, the indicators dynamically change to reflect the current shape of parts of the corresponding sections that are outside the content display window. In the FIG. 6, when reaching the bottom most of the content page, the bottom parts of the indicators 501 and 502 will not become any less along with your sliding, indicating there is no content left at the bottom of the content page that can be dragged up into the screen. In this case, the indicator 501 disappears since the left bottom corner of the content page is displayed, and the indicator 501 having a shape of side-inverted "L" changes to the indicator 602 having a shape of "-", showing the bottom most of the content page is reached.

Figure 7:
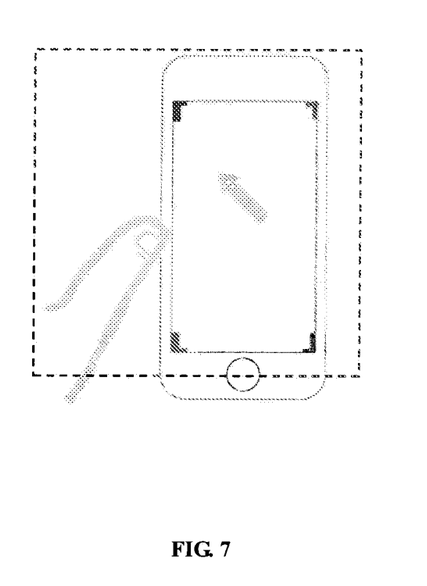
Figure 8:
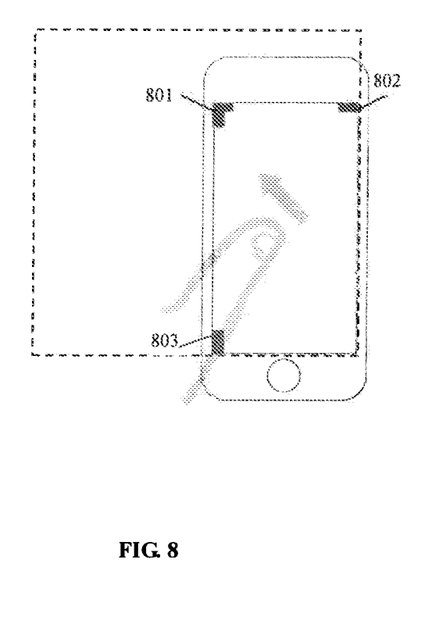

FIG. 7 and FIG. 8 show a two-dimensional sliding operation on the screen according to one embodiment of the present invention. FIG. 7 shows the state before the sliding operation and FIG. 8 shows the statue after the sliding operation. In the FIG. 7, the shape of each of the indicators is the same as the shape of part of the corresponding section that is outside the content display window, and the size of each of the indicators is proportional to the size of part of the corresponding section that is outside the content display window. For example, before the sliding operation, the screen displays four indicators with "L" shape or similar shape, showing the area displayed on the screen does not reach any edges of the content page. Under the state of FIG. 7, the user touches the screen with a finger and slides the content page in an arbitrary direction (in this case, towards the left up corner of the screen). With the sliding operation, the indicators dynamically change to reflect the current shape of parts of the corresponding sections that are outside the content display window. In the FIG. 8, when reaching the right bottom corner of the content page, the indicator at the right bottom corner of the screen disappears, the indicator 801 becomes a thick inverted "L", the indicator 802 becomes a thick "-", and the indicator 803 becomes a thick "l". The thickness of the indicators indicate the amount of contents exceed the corresponding edge of the screen.

In one aspect it was determined that features set forth herein can address limitations and drawbacks associated with use of scroll bars. Besides the concern in the mobile device, there is also the same concern in the traditional computer device such as desktop, laptop and etc. For example, it was determine that in a content display window in a laptop, two separate one-dimensional scroll bars are used to indicate the browsing progress. One scroll bar is a horizontal scroll bar, which shows, by the position of the slider on this scroll bar, the position of the content currently displayed in the window on the whole page in the horizontal direction; and the other scroll bar is a vertical scroll bar, which shows, by the position of the slider on this scroll bar, the position of the content currently displayed in the window on the whole page in the vertical direction. In this case, users need to check the horizontal and vertical scroll bars respectively, since there is actually no relationship between them.

Additionally, it was determined that if the two one-dimensional scroll bars described above are applied to a mobile device, it will cause other problems. The content focusing operation is actually different between a mobile device and a PC. On a mobile device, the content displayed will moves in the same direction as a slide operation of a finger, however, on a PC, normally, users will operate the sliders in the scroll bars directly to move the focus of the contents. It was determined that scroll bars will be confusing when they are used in a mobile device, since when you use a finger to slide the content page to one direction, the sliders in the scroll bars will move in an opposite direction. For example, it was determined that if one slides upwards on the touch screen of a mobile device, the content displayed will also go upwards, but the slider on the vertical scroll bar will go downwards, which produces inconsistent experience for the users.

In one embodiment, of the present invention where a touch screen of a mobile device is concerned, the user operation may be one of: slide, pinch in, pinch out. In another embodiment of the present invention where a screen of a PC is concerned, the user operation may be one of: drag with a mouse and zoom with a mouse. The above user operations are only examples. Any other user operations that cause the content page to move relative to the content display window will trigger the change of shape and/or size of the indicators.

With the above embodiments, of the invention, an integrated two-dimensional view of how many contents are left outside the content display window in both of horizontal and vertical directions is provided. Such an indication mechanism is more intuitive than using sliders in scroll bar. Additionally, for a mobile device with a small screen, the indicators according to the present invention will occupy a smaller area than two scroll bars, so that more contents can be displayed on the small screen in one time.

The present invention may be a system, a method, and/or a computer program product. The computer program product may include a computer readable storage medium (or media) having computer readable program instructions thereon for causing a processor to carry out aspects of the present invention.

In an embodiment, of the present invention, there is provided a system for two-dimensional indication in browsing contents. The system comprises a memory and one or more processor. The system further comprises a set of computer program instructions stored in the memory and executed by the one or more processor in order to perform an action of displaying a content page in a content display window, wherein at least one of length and width of the content page exceeds the size of the content display window. The system further comprises a set of computer program instructions stored in the memory and executed by the one or more processor in order to perform an action of displaying indicators located at four corners of the content display window, wherein each of the indicators indicates the size of part of the content page that is outside the corresponding corner of the content display window. The system further comprises a set of computer program instructions stored in the memory and executed by the one or more processor in order to perform an action of in response to detecting a user operation that moves the content page relative to the content display window, changing each of the indicators to reflect the current size of part of the content page that is outside the corresponding corner of the content display window.

In one embodiment, of the system, the content page is a page that contains at least one of web page, picture, table, and map.

In one embodiment, of the system, the content page is divided by a horizontal central line and a vertical central line of the content display window into four sections, and the size of each of the indicators indicates the size of part of the corresponding section that is outside the corresponding corner of the content display window.

In one embodiment, of the system, the shape of each of the indicators is the same as the shape of part of the corresponding section that is outside the content display window.

In one embodiment, of the system, the size of each of the indicators is proportional to the size of part of the corresponding section that is outside the content display window.

In one embodiment, of the system, the user operation is one of: slide, pinch in, pinch out, drag with a mouse and zoom with a mouse.

In one embodiment, of the system, the set of computer program instructions being stored in the memory and executed by the one or more processor in order to perform action of: in response to detecting a user operation that moves the content page relative to the content display window, the shape of each of the indicators changes to reflect the current shape of part of the corresponding section that is outside the content display window.

In an embodiment, there is provided a computer program product for two-dimensional indication in browsing contents. The computer program product can include a computer readable storage medium readable by one or more processing circuit and storing instructions for execution by a one or more processor for performing a method. The method can comprise displaying a content page in a content display window, wherein at least one of length and width of the content page exceeds the size of the content display window. The method can further comprise displaying indicators located at four corners of the content display window, wherein each of the indicators indicates the size of part of the content page that is outside the corresponding corner of the content display window. The method can further comprise in response to detecting a user operation that moves the content page relative to the content display window, changing each of the indicators to reflect the current size of part of the content page that is outside the corresponding corner of the content display window.

In one embodiment, of the computer program product, the content page is a page that contains at least one of web page, picture, table, and map.

In one embodiment, of the computer program product, the content page is divided by a horizontal central line and a vertical central line of the content display window into four sections, and the size of each of the indicators indicates the size of part of the corresponding section that is outside the corresponding corner of the content display window.

In one embodiment, of the computer program product, the shape of each of the indicators is the same as the shape of part of the corresponding section that is outside the content display window.

In one embodiment, of the computer program product, the size of each of the indicators is proportional to the size of part of the corresponding section that is outside the content display window.

In one embodiment, of the computer program product, the user operation is one of: slide, pinch in, pinch out, drag with a mouse and zoom with a mouse.

In one embodiment, of the computer program product, the method further comprising: in response to detecting a user operation that moves the content page relative to the content display window, the shape of each of the indicators changes to reflect the current shape of part of the corresponding section that is outside the content display window.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    displaying, by one or more processor, a content page in a content display window, wherein at least one of length and width of the content page exceeds a size of the content display window;
    displaying, by the one or more processor, indicators located at four corners within a perimeter defining the content display window, wherein each of the indicators indicates a size of part of the content page that is outside a corresponding corner of the content display window; and
    in response to detecting a user operation that moves the content page relative to the content display window, changing, by the one or more processor, each of the indicators to reflect a current size of part of the content page that is outside the corresponding corner of the content display window, wherein the content page is divided by a horizontal central line and a vertical central line of the content display window into four sections, and wherein a size of each of the indicators indicates a size of the corresponding section of the content page that is outside the corresponding corner of the content display window, wherein a shape of each of the indicators is the same as a shape of the corresponding section of the content page that is outside the corresponding corner of the content display window.

2. The method according to claim 1, wherein the content page is a page that contains at least one of the following selected from the group consisting of: web page, picture, table, and map.

3. The method according to claim 1, wherein the user operation is one of the following selected from the group consisting of: slide, pinch in, pinch out, drag with a mouse and zoom with a mouse.

4. A system comprising:
    a memory;
    one or more processor in communication with the memory; and
    program instructions executable by the one or more processor via the memory to perform a method, the method comprising:
        displaying a content page in a content display window, wherein at least one of length and width of the content page exceeds a size of the content display window;
        displaying indicators located at four corners within a perimeter defining the content display window, wherein each of the indicators indicates a size of part of the content page that is outside a corresponding corner of the content display window; and
        in response to detecting a user operation that moves the content page relative to the content display window, changing each of the indicators to reflect a current size of part of the content page that is outside the corresponding corner of the content display window, wherein the content page is divided by a horizontal central line and a vertical central line of the content display window into four sections, and wherein a size of each of the indicators indicates a size of the corresponding section of the content page that is outside the corresponding corner of the content display window, wherein a shape of each of the indicators is the same as a shape of the corresponding section of the content page that is outside the corresponding corner of the content display window.

5. The method according to claim 4, wherein the content page is a page that contains at least one of the following selected from the group consisting of: web page, picture, table, and map.

6. The method according to claim 4, wherein the user operation is one of the following selected from the group consisting of: slide, pinch in, pinch out, drag with a mouse and zoom with a mouse.

7. A computer program product comprising:
    a computer readable storage medium readable by one or more processing circuit and storing instructions for execution by a one or more processor for performing a method comprising:
        displaying a content page in a content display window, wherein at least one of length and width of the content page exceeds a size of the content display window;
        displaying indicators located at four corners within a perimeter defining the content display window, wherein each of the indicators indicates a size of part of the content page that is outside a corresponding corner of the content display window; and
        in response to detecting a user operation that moves the content page relative to the content display window, changing each of the indicators to reflect a current size of part of the content page that is outside the corresponding corner of the content display window, wherein the content page is divided by a horizontal central line and a vertical central line of the content display window into four sections, and wherein a size of each of the indicators indicates a size of the corresponding section of the content page that is outside the corresponding corner of the content display window, wherein a shape of each of the indicators is the same as a shape of the corresponding section of the content page that is outside the corresponding corner of the content display window.

8. The computer program product according to claim 7, wherein the content page is a page that contains at least one of the following selected from the group consisting of: web page, picture, table, and map.

9. The method according to claim 7, wherein the user operation is one of the following selected from the group consisting of: slide, pinch in, pinch out, drag with a mouse and zoom with a mouse.

* * * * *